United States Patent
Ronner et al.

(10) Patent No.: US 8,259,473 B2
(45) Date of Patent: Sep. 4, 2012

(54) METHOD FOR OPERATION OF A CONVERTER CIRCUIT AND APPARATUS FOR CARRYING OUT THE METHOD

(75) Inventors: Beat Ronner, Birr (CH); Tobias Thurnherr, Ennetbaden (CH)

(73) Assignee: ABB Schweiz AG, Baden (CH)

( * ) Notice: Subject to any disclaimer, the term of this patent is extended or adjusted under 35 U.S.C. 154(b) by 0 days.

(21) Appl. No.: 13/185,992

(22) Filed: Jul. 19, 2011

(65) Prior Publication Data

US 2012/0013199 A1    Jan. 19, 2012

Related U.S. Application Data

(63) Continuation of application No. PCT/EP2010/050415, filed on Jan. 14, 2010.

(30) Foreign Application Priority Data

Jan. 20, 2009    (EP) ..................................... 09150938

(51) Int. Cl.
    *H02M 1/12*    (2006.01)
    *H02M 1/14*    (2006.01)
(52) U.S. Cl. ................ 363/39; 363/40; 363/44; 363/47; 323/205; 323/207
(58) Field of Classification Search .................... 363/39, 363/40, 44, 47; 323/205, 207
    See application file for complete search history.

(56) References Cited

U.S. PATENT DOCUMENTS

| | | | |
|---|---|---|---|
| 6,233,161 B1 * | 5/2001 | Balakrishnan et al. | 363/16 |
| 6,246,596 B1 * | 6/2001 | Yamazaki | 363/49 |
| 2004/0085782 A1 * | 5/2004 | Park | 363/16 |
| 2005/0243579 A1 * | 11/2005 | Jang et al. | 363/16 |
| 2006/0126366 A1 * | 6/2006 | Park | 363/18 |
| 2007/0035970 A1 * | 2/2007 | Park | 363/18 |
| 2010/0033156 A1 * | 2/2010 | Abe et al. | 323/305 |

OTHER PUBLICATIONS

International Search Report (PCT/ISA/210) issued on Jun. 8, 2010, by European Patent Office as the International Searching Authority for International Application No. PCT/EP2010/050415.

(Continued)

*Primary Examiner* — Bao Q Vu
(74) *Attorney, Agent, or Firm* — Buchanan Ingersoll & Rooney PC

(57) ABSTRACT

A method and apparatus are provided for operation of a converter circuit, which includes a converter unit having a multiplicity of controllable power semiconductor switches, and which is connected via a transformer to a three-phase electrical AC voltage power supply system. The method includes controlling the controllable power semiconductor switches by means of a control signal which is formed from a regulating signal. In order to damp oscillations of a power supply system voltage above the fundamental frequency, a filtered power supply system current is formed by filtering a power supply system current using a low-pass filter characteristic. A filtered transformer inductance voltage is formed by filtering a transformer inductance voltage, which is formed from the power supply system current, using a low-pass filter characteristic. A filtered power supply system voltage is formed by filtering a power supply system voltage using a low-pass filter characteristic. The regulating signal is formed by addition of a regulator voltage, the filtered transformer inductance voltage, and the filtered power supply system voltage, where the regulator voltage is formed by regulating the filtered power supply system current at a power supply system current nominal value.

25 Claims, 6 Drawing Sheets

OTHER PUBLICATIONS

European Search Report issued Oct. 30, 2009 for European Application No. EP 09150938.

International Preliminary Report on Patentability (PCT/IPEA/409) issued Sep. 7, 2010 by European Patent Office as International Examining Authority for International Application No. PCT/EP2010/050415.

Liu Y et al, Trinary hybrid multilevel inverter used in STATCOM with unbalanced voltages, IEE Proc-Elect Power Appln, vol. 152, No. 5, Sep. 2005, pp. 1203-1222.

Zhu P. et al., Control scheme for a universal power quality manager in a two-phase synchronous rotating frame, IEE Proc- Gener. Transm Distrib, vol. 151, No. 5, Sep. 2004, pp. 590-596.

Pengcheng Zhu et al., A Novel Control Scheme for a Unified Power Flow Controller, May 21, 2006, pp. 1-9, XP031331127.

Zhang Yong-Gao et al., Double Closed Loop Control and Analysis for Shunt Inverter of UPFC, May 21, 2006, XP031331124.

Bozhko S V et al., Control of Offshore DFIG-Based Wind Farm Grid With Line-Commutated HVDC Connection, IEEE Transactions on Energy Conversion, vol. 22, No. 1, Mar. 2007, pp. 71-78.

* cited by examiner

US 8,259,473 B2

METHOD FOR OPERATION OF A CONVERTER CIRCUIT AND APPARATUS FOR CARRYING OUT THE METHOD

RELATED APPLICATION

This application claims priority as a continuation application under 35 U.S.C. §120 to PCT/EP 2010/050415, which was filed as an International Application on Jan. 14, 2010 designating the U.S., and which claims priority to European Application 09150938.0 filed in Europe on Jan. 20, 2009. The entire contents of these applications are hereby incorporated by reference in their entireties.

FIELD

The present disclosure relates to the field of power electronics. More particularly, the present disclosure is related to a method for operation of a converter circuit, and an apparatus for carrying out the method.

BACKGROUND INFORMATION

Conventional converter circuits include a multiplicity of controllable power semiconductor switches, which are switched in a known manner in order to switch at least two switching voltage levels. A converter circuit such as this can be connected to an electrical AC voltage power supply system which can be in the form of a three-phase power supply system. Converter circuits such as these are frequently used in industrial installations, with the converter circuits being coupled to the power supply system via a transformer, and with further fields of use and usage options, such as wind power installations, being feasible, of course.

FIG. 1 illustrates a conventional apparatus for operation of a converter circuit as described above. In this apparatus, the converter circuit has a converter unit 2 with a multiplicity of controllable power semiconductor switches. The converter unit is connected via a transformer to a three-phase electrical AC voltage power supply system 1. It should be mentioned that the three-phase electrical AC voltage power supply system 1 with a three-phase power supply system voltage, a three-phase power supply system current and a three-phase transformer inductance voltage is shown in FIG. 1, for the sake of clarity, as a single-phase equivalent circuit with a single-phase power supply system voltage $u_G$, a single-phase power supply system current $i_G$ and a single-phase transformer inductance voltage $u_{LT}$. As is shown in FIG. 1, the apparatus for operation of the converter circuit has a regulating apparatus 4, which is used to produce a regulating signal $S_R$ and is connected via a control circuit 3 for forming a control signal $S_A$ to the controllable power semiconductor switches. FIG. 2 shows a conventional regulating apparatus 4. As is shown in FIG. 2, the regulating apparatus 4 includes an addition unit 9 for formation of the regulating signal $S_R$ by addition of a regulator voltage $u_R$, a transformer inductance voltage $u_{LT}$ which is formed from a power supply system current $i_G$, and a power supply system voltage $u_G$. The transformer inductance voltage $u_{LT}$ is formed from the power supply system current $i_G$ and a transformer inductance $L_T$ by means of a calculation unit 10. The regulating apparatus 4 has a regulator unit 5 for formation of the regulator voltage $u_R$ by regulating the filtered power supply system current $i_G$ at a power supply system current nominal value $i_{Gref}$.

The conventional apparatus mentioned above for operation of the converter circuit and the method relating thereto make it possible to regulate the power supply system current $i_G$, but oscillations above the fundamental frequency can occur in the power supply system voltage $u_G$ in an electrical AC voltage power supply system 1. However, these oscillations are highly undesirable and cannot be damped, and therefore cannot be reduced, by means of the apparatus described above for operation of the converter circuit, and the method relating thereto. Oscillations such as these occur, for example, when the power supply system has lightly damped resonance points. FIG. 3 shows a profile such as this, with oscillations, of the power supply system voltage $u_G$ according to the above-described conventional arrangement.

SUMMARY

An exemplary embodiment of the present disclosure provides a method for operation of a converter circuit. The converter includes a converter unit having a multiplicity of controllable power semiconductor switches, and the converter unit is connected via a transformer to a three-phase electrical AC voltage power supply system. The exemplary method includes controlling the controllable power semiconductor switches by means of a control signal which is formed from a regulating signal. The exemplary method also includes forming a filtered power supply system current by filtering a power supply system current using a low-pass filter characteristic, where the filtering of the power supply system current is carried out in a first filtering process using a system which rotates at the fundamental frequency of a power supply system voltage. In addition, the exemplary method includes forming a filtered transformer inductance voltage by filtering the transformer inductance voltage, which is formed from the power supply system current, using a low-pass filter characteristic, where the filtering of the transformer inductance voltage is carried out in a second filtering process using a system which rotates at the fundamental frequency of the power supply system voltage. The exemplary method also includes forming a filtered power supply system voltage filtering the power supply system voltage using a low-pass filter characteristic, where the filtering of the power supply system voltage is carried out in a third filtering process using a system which rotates at the fundamental frequency of the power supply system voltage. In addition, the exemplary method includes forming the regulating signal by addition of a regulator voltage, the filtered transformer inductance voltage, and the filtered power supply system voltage. The regulator voltage is formed by regulating the filtered power supply system current at a power supply system current nominal value.

An exemplary embodiment of the present disclosure provides an apparatus for carrying out a method for operation of a converter circuit. The converter circuit includes a converter unit having a multiplicity of controllable power semiconductor switches, and the converter circuit is connected via a transformer to a three-phase electrical AC voltage power supply system. The exemplary apparatus includes a regulating apparatus which is configured to produce a regulating signal and is connected via a control circuit for forming a control signal to the controllable power semiconductor switches. The regulating apparatus includes a first filter configured to form a filtered power supply system current by filtering a power supply system current using a low-pass filter characteristic, where the first filter is configured to filter the power supply system current using a system which rotates at the fundamental frequency of a power supply system voltage. The regulating apparatus also includes a second filter configured to form a filtered transformer inductance voltage by filtering a transformer inductance voltage, which is formed from the power supply system current, using a low-pass filter characteristic, where the second filter is configured to filter the transformer inductance voltage using a system which rotates at the fundamental frequency of the power supply system voltage. In addition, the regulating apparatus includes a third filter configured to form a filtered power supply system voltage by filtering the power supply system voltage using a low-pass filter characteristic, where the third filter is configured to filter the power supply system voltage using a system which rotates at the fundamental frequency of the power supply system voltage. Furthermore, the regulating apparatus includes an addition unit configured to form the regulating signal by addition of a regulator voltage, the filtered transformer inductance voltage, and the filtered power supply system voltage. The regulating apparatus also includes a regulator unit configured to form the regulator voltage by regulating the filtered power supply system current at a power supply system current nominal value.

An exemplary embodiment of the present disclosure provides a non-transitory computer-readable recording medium having a computer program recorded thereon that causes a processor a computer processing device to carry out a method for operation of a converter circuit. The converter includes a converter unit having a multiplicity of controllable power semiconductor switches, and the converter unit is connected via a transformer to a three-phase electrical AC voltage power supply system. The program causes to execute an operation of controlling the controllable power semiconductor switches by means of a control signal which is formed from a regulating signal. The program also causes the processor to execute an operation of forming a filtered power supply system current by filtering a power supply system current using a low-pass filter characteristic, where the filtering of the power supply system current is carried out in a first filtering process using a system which rotates at the fundamental frequency of a power supply system voltage. In addition, the program causes the processor to execute an operation of forming a filtered transformer inductance voltage by filtering the transformer inductance voltage, which is formed from the power supply system current, using a low-pass filter characteristic, where the filtering of the transformer inductance voltage is carried out in a second filtering process using a system which rotates at the fundamental frequency of the power supply system voltage. Furthermore, the program causes the processor to execute an operation of forming a filtered power supply system voltage filtering the power supply system voltage using a low-pass filter characteristic, where the filtering of the power supply system voltage is carried out in a third filtering process using a system which rotates at the fundamental frequency of the power supply system voltage. In addition, the program causes the processor to execute an operation of forming the regulating signal by addition of a regulator voltage, the filtered transformer inductance voltage, and the filtered power supply system voltage. The regulator voltage is formed by regulating the filtered power supply system current at a power supply system current nominal value.

BRIEF DESCRIPTION OF THE DRAWINGS

Additional refinements, advantages and features of the present disclosure are described in more detail below with reference to exemplary embodiments illustrated in the drawings, in which.

Figure 1:
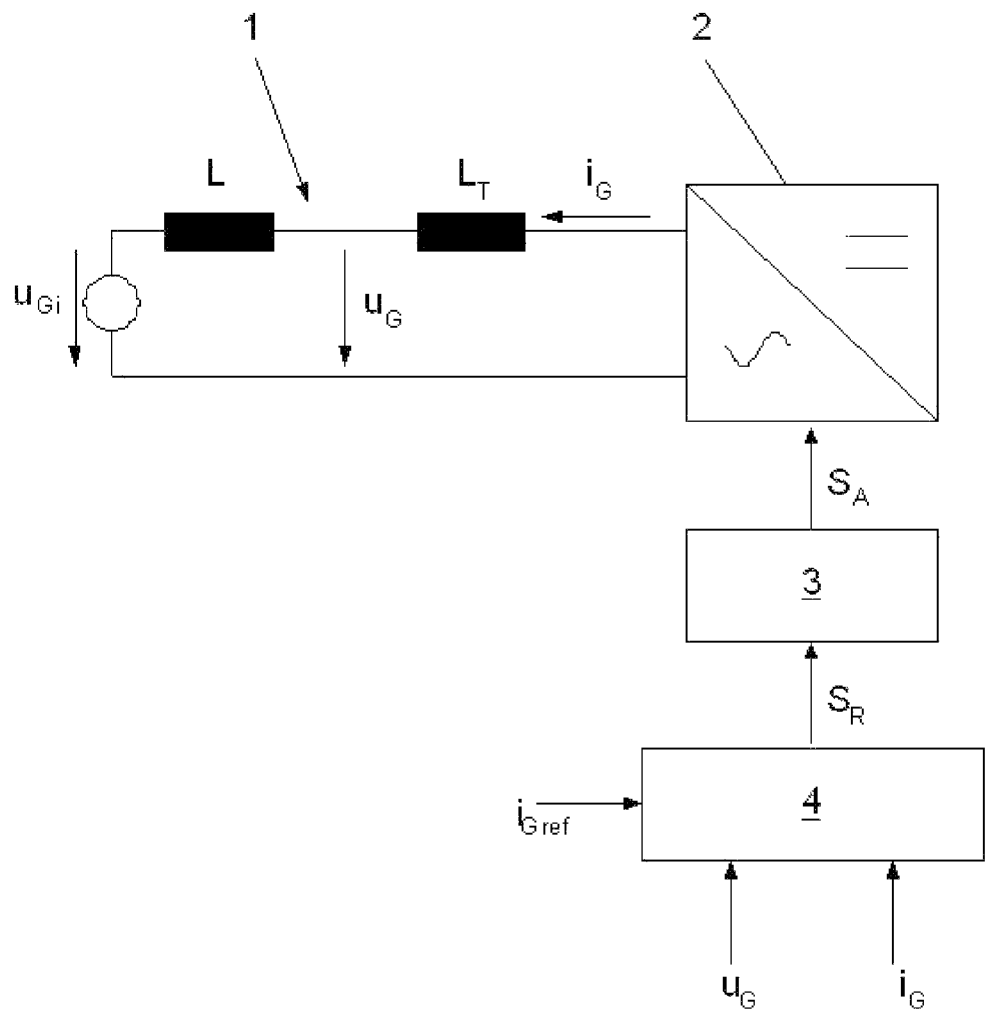
FIG. 1 shows a conventional apparatus for carrying out a method for operation of a converter circuit.
Figure 2:
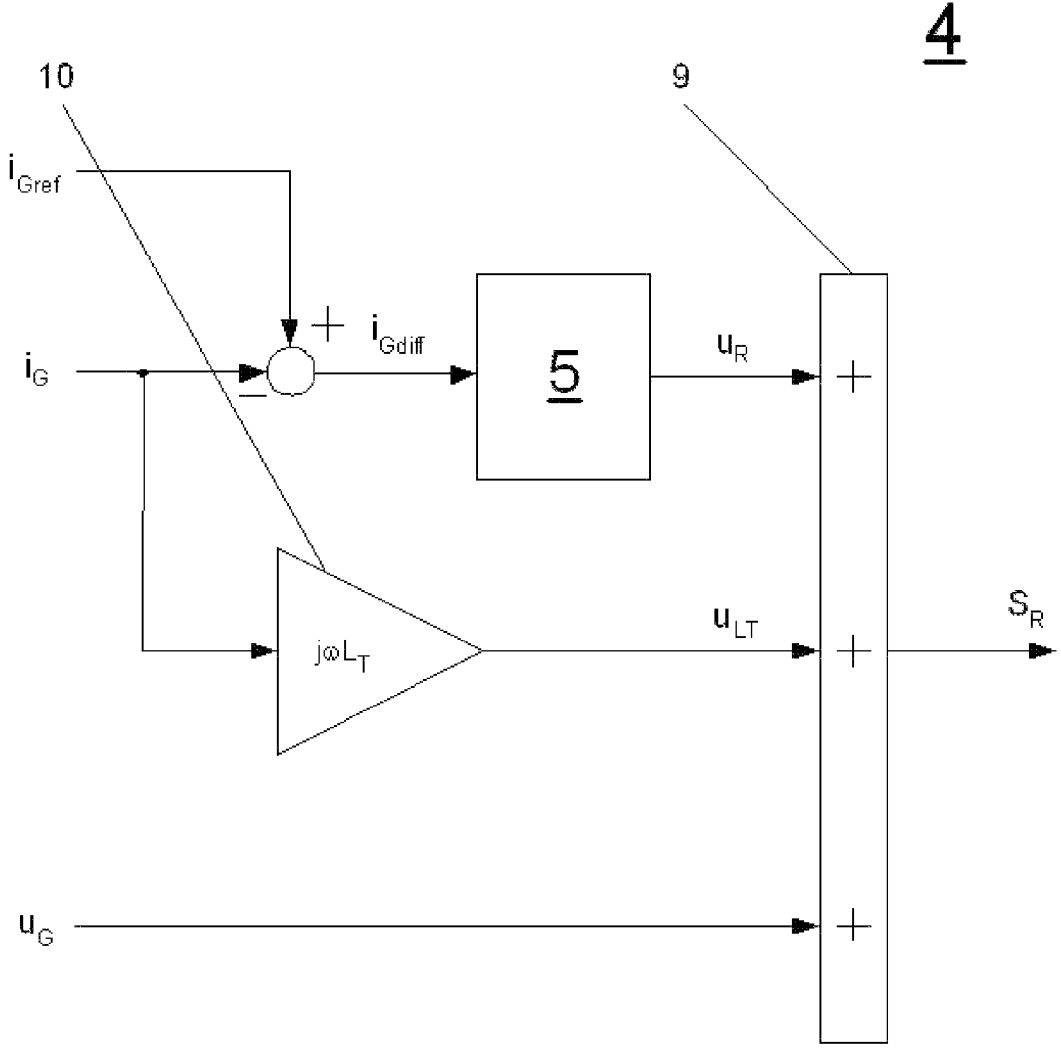
FIG. 2 shows a conventional regulating apparatus included in the conventional apparatus for carrying out a method as shown in FIG. 1.
Figure 3:
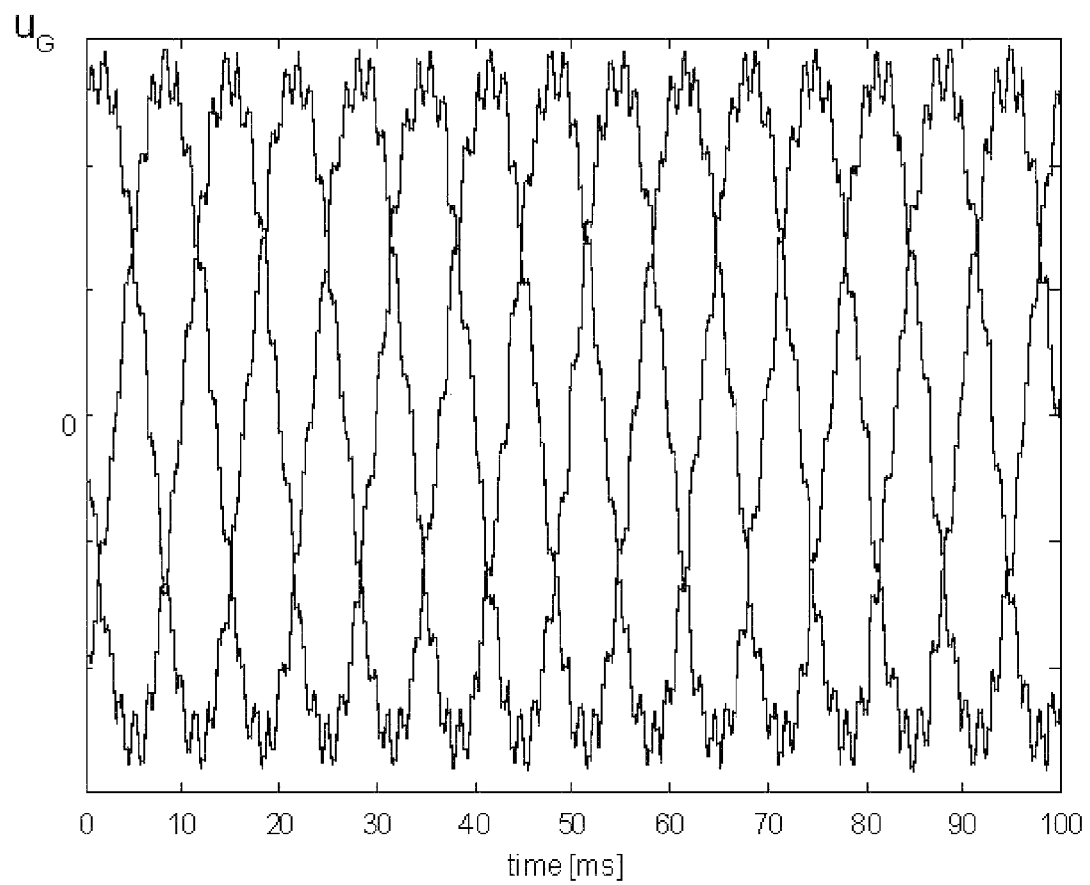
FIG. 3 shows a normal time profile of the power supply system voltage of a three-phase electrical AC voltage power supply system.

The reference symbols used in the drawings, and their meanings, are listed in summarized form in the list of reference symbols. In principle, the same parts are provided with the same reference symbols in the drawings. The described embodiments represent examples of the subject matter of the disclosure, and have no restrictive effect.

DETAILED DESCRIPTION

Exemplary embodiments of the present disclosure provide a method for operation of a converter circuit, by means of which undesirable oscillations in the power supply system voltage above the fundamental frequency of an electrical AC voltage power supply system which is connected to the converter circuit can be damped or reduced. Exemplary embodiments of the present disclosure also provide an apparatus by means of which the method can be carried out in a particularly simple manner.

In accordance with an exemplary embodiment, the converter circuit has a converter unit with a multiplicity of controllable power semiconductor switches. The converter circuit is connected via a transformer to a three-phase electrical AC voltage power supply system. In accordance with an exemplary embodiment of the method according to the present disclosure for operation of the converter circuit, the controllable power semiconductor switches are controlled by means of a control signal which is formed from a regulating signal. In accordance with an exemplary embodiment, a filtered power supply system current is formed by filtering a power supply system current using a low-pass filter characteristic, a filtered transformer inductance voltage is formed by filtering a transformer inductance voltage, which is formed from the power supply system current, using a low-pass filter characteristic, and a filtered power supply system voltage is formed by filtering a power supply system voltage using a low-pass filter characteristic. Furthermore, the regulating signal is formed by addition of a regulator voltage, the filtered transformer inductance voltage and the filtered power supply system voltage, where the regulator voltage is formed by regulating the filtered power supply system current at a power supply system current nominal value. Oscillations in the power supply system voltage above the fundamental frequency are damped, and therefore advantageously reduced, by these measures. The filtering processes mentioned above using a low-pass filter characteristic are carried out, for example, in a system which rotates at the fundamental frequency of the power supply system voltage, where the fundamental oscillation of the power supply system voltage then appear as a constant component in this system. As a result, the fundamental frequency of the power supply system voltage is advantageously not influenced by the filtering processes using a low-pass filter characteristic when using the method according to the present disclosure. Rather, advantageously, only the oscillations in the power supply system voltage above the fundamental frequency are damped, and therefore advantageously reduced. Furthermore, the filtering of the power supply system current using a low-pass filter characteristic, which power supply system current also contains an oscillation at the fundamental frequency of the power supply system voltage, means that the subsequent regulation of the filtered power supply system current at the power supply system current nominal value, which power supply system current nominal value can include only the fundamental frequency of the power supply system voltage, has to regulate only the already filtered power supply system current at this power supply system current nominal value without oscillations above the fundamental frequency of the power supply system voltage having a negative influence on the regulation. The addition of the filtered transformer inductance voltage and the filtered power supply system voltage to the regulator voltage represents pilot control for the regulation of the filtered power supply system current at the power supply system current nominal value, thus advantageously making it possible to greatly reduce the load on the regulation.

In accordance with an exemplary embodiment of the present disclosure, the apparatus for carrying out the method for operation of the converter circuit includes a regulating apparatus, which is configured to produce the regulating signal and is connected via a control circuit for forming the control signal to the controllable power semiconductor switches. In accordance with an exemplary embodiment of the present disclosure, the regulating apparatus includes a first filter for formation of the filtered power supply system current by filtering the power supply system current, using a low-pass filter characteristic. The regulating apparatus also includes a second filter for formation of the filtered transformer inductance voltage by filtering the transformer inductance voltage, which is formed from the power supply system current, using a low-pass filter characteristic. In addition, the regulating apparatus includes a third filter for formation of the filtered power supply system voltage by filtering the power supply system voltage using a low-pass filter characteristic. Furthermore, the regulating apparatus includes an addition unit for formation of the regulating signal by addition of the regulator voltage, the filtered transformer inductance voltage and the filtered power supply system voltage. The regulating apparatus also includes a regulator unit for formation of the regulator voltage by regulating the filtered power supply system current at the power supply system current nominal value. In accordance with an exemplary embodiment of the present disclosure, the apparatus for carrying out the method for operation of the converter circuit can therefore be implemented very easily and at low cost, since the circuit complexity can be kept extremely low and, furthermore, only a small number of components are required for construction. The method according to the disclosure can therefore be carried out particularly easily by means of this apparatus.

These and further advantages and features of the present disclosure will be described in further detail below in the following detailed description of exemplary embodiments of the present disclosure, in conjunction with the drawings.

As already mentioned initially, FIG. 1 shows a conventional apparatus for carrying out a method for operation of a converter circuit. As is shown in FIG. 1, the converter circuit includes a converter unit 2 with a multiplicity of controllable power semiconductor switches. The converter unit 2 is connected via a transformer to a three-phase electrical AC voltage power supply system 1. It should be mentioned that the converter unit 1 may, in general, be in the form of any converter unit 1 for switching two or more switching DC voltage levels (e.g., a multi-level converter circuit). The three-phase electrical AC voltage power supply system 1 with a three-phase power supply system voltage, a three-phase power supply system current and a three-phase transformer inductance voltage is illustrated in FIG. 1, for the sake of clarity, as a single-phase equivalent circuit with a single-phase power supply system voltage $u_G$, a single-phase power supply system current $i_G$ and a single-phase transformer inductance voltage $u_{LT}$.

In the method according to the present disclosure for operation of the converter circuit, the controllable power semiconductor switches are controlled by means of a control signal $S_A$ which is formed from a regulating signal $S_R$. In accordance with an exemplary embodiment of the present disclosure, a filtered power supply system current $i_{GTP}$ is formed by filtering a power supply system current $i_G$ using a low-pass filter characteristic, a filtered transformer inductance voltage $u_{LTTP}$ is formed by filtering a transformer inductance voltage $u_{LT}$, which is formed from the power supply system current $i_G$, using a low-pass filter characteristic, and a filtered power supply system voltage $u_{GTP}$ is formed by filtering a power supply system voltage $u_G$ using a low-pass filter characteristic. The regulating signal $S_R$ is formed by addition of a regulator voltage $u_R$, the filtered transformer inductance voltage $u_{LTTP}$ and the filtered power supply system voltage $u_{GTP}$. The regulator voltage $u_R$ is formed by regulating the filtered power supply system current $i_{GTP}$ at a power supply system current nominal value $i_{Gref}$. Oscillations in the power supply system voltage $u_G$ above the fundamental frequency are damped, and therefore advantageously reduced, by these measures. The filtering processes mentioned above using a low-pass filter characteristic are carried out, for example, using a system which rotates at the fundamental frequency of the power supply system voltage $u_G$, with the fundamental oscillation of the power supply system voltage $u_G$ then appearing as a constant component in this system, such that the fundamental frequency of the power supply system voltage $u_G$ is advantageously not influenced by the filtering processes using a low-pass filter characteristic. On the contrary, in accordance with an exemplary embodiment of the method according to the present disclosure, only the oscillations in the power supply system voltage $u_G$ above the fundamental frequency are damped, and therefore advantageously reduced. Furthermore, the filtering of the power supply system current $i_G$ using a low-pass filter characteristic, which current also contains an oscillation at the fundamental frequency of the power supply system voltage $u_G$, results in the subsequent regulation of the filtered power supply system current $i_{GTP}$ at the power supply system current nominal value $i_{Gref}$, which power supply system current nominal value $i_{Gref}$ can have only the fundamental frequency of the power supply system voltage $u_G$, now has to regulate only the already filtered power supply system current $i_{GTP}$ at this power supply system current nominal value $i_{Gref}$, without oscillations above the fundamental frequency of the power supply system voltage $u_G$ having any negative influence on the regulation. The addition of the filtered transformer inductance voltage $u_{LTTP}$ and the filtered power supply system voltage $u_{GTP}$ to the regulator voltage $u_R$ represents pilot control for the regulation of the filtered power supply system current $i_{GTP}$ at the power supply system current nominal value $i_{Gref}$, thus advantageously making it possible to significantly reduce the load on the regulation.

Figure 5:
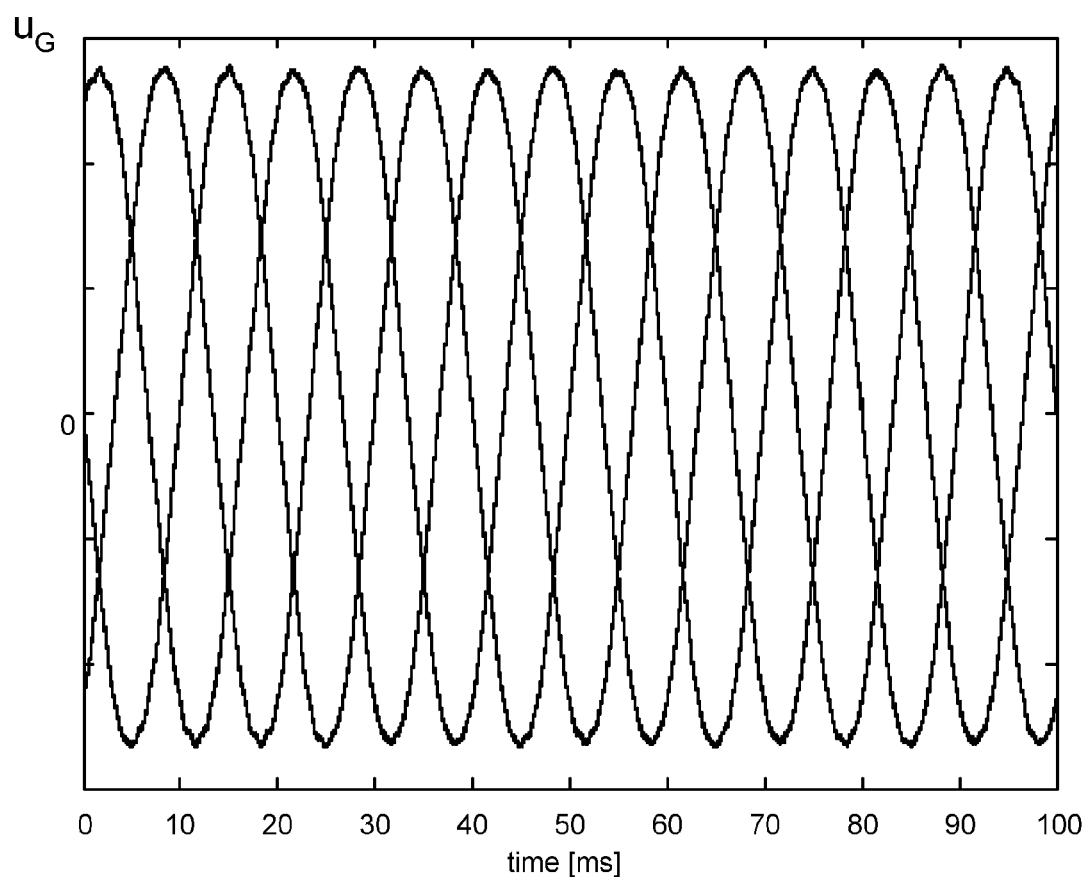
FIG. 5 shows a time profile of the power supply system voltage of a three-phase electrical AC voltage power supply system using the method according to an exemplary embodiment of the present disclosure for operation of the converter circuit.

FIG. 5 shows a time profile of the power supply system voltage $u_G$ of the three-phase electrical AC voltage power supply system when using the exemplary method according to the present disclosure for operation of the converter circuit. As illustrated in FIG. 5, a considerable reduction or damping of undesirable oscillations of the power supply system voltage $u_G$ above the fundamental frequency is achieved by using the exemplary method according to the present disclosure for operation of the converter circuit.

At this point, it should be mentioned that filtering would also be feasible using a low-pass filter characteristic of only one or two of the variables to be filtered mentioned above, that is to say, for example, exclusive filtering of the power supply system current $i_G$ using a low-pass filter characteristic or exclusive filtering of the power supply system current $i_G$ and of the power supply system voltage $u_G$ using a low-pass filter characteristic. Furthermore, bandstop filtering of all the variables to be filtered mentioned above or bandstop filtering of only one or two of the variables to be filtered mentioned above would also be feasible. Furthermore, any combination of filtering using a low-pass filter characteristic and bandstop filtering of all of the variables to be filtered mentioned above or of only two of the variables to be filtered mentioned above would also be feasible, that is to say, for example, exclusive bandstop filtering of the power supply system current $i_G$ and exclusive filtering of the power supply system voltage $u_G$ using a low-pass filter characteristic.

In accordance with an exemplary embodiment, the transformer inductance voltage $u_{LT}$ can be calculated from the power supply system current $i_G$ and a transformer inductance $L_T$. The calculation can be carried out using the following formula:

$$u_{LT} = j\omega L_T i_G$$

In accordance with an exemplary embodiment, the filtering processes using a low-pass filter characteristic can each carried out with second-order filtering, thus advantageously making it possible to achieve excellent damping, and therefore reduction, of the undesirable oscillations in the power supply system voltage $u_G$ above the fundamental frequency.

Figure 6:
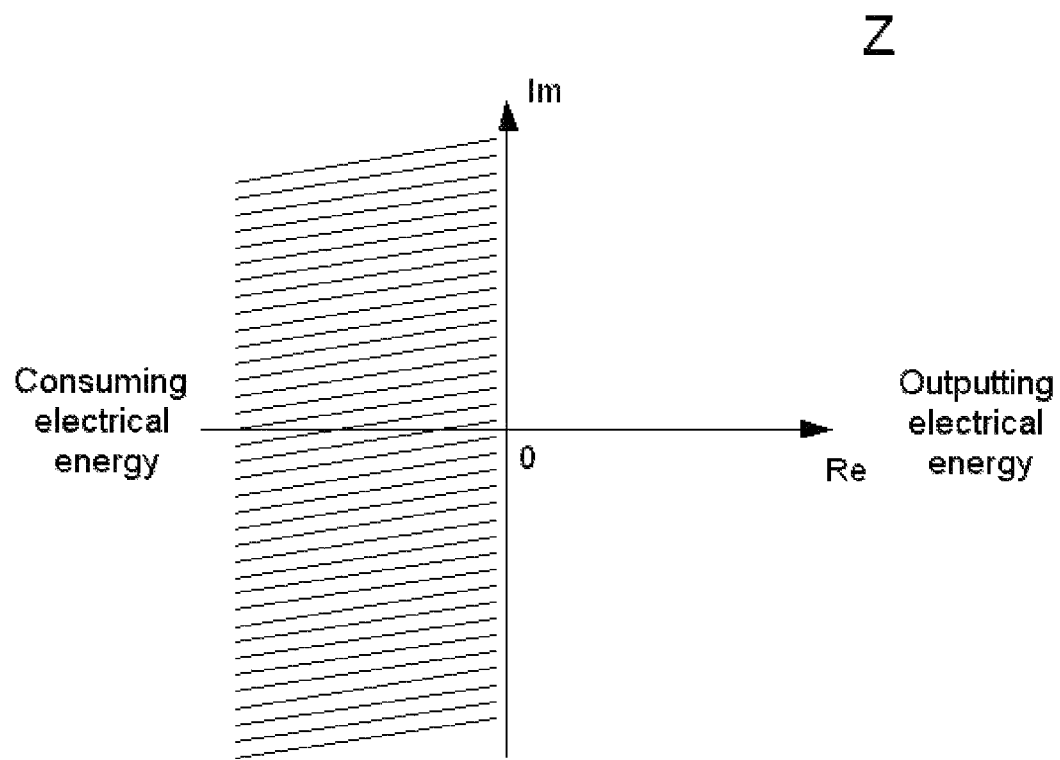
FIG. 6 shows a range of an input impedance Z of a converter unit in the converter circuit used for the method according to an exemplary embodiment of the present disclosure for operation of the converter circuit.

The transfer functions of the filtering processes used in a low-pass filter characteristic can be chosen such that the input impedance Z of the converter unit 2 corresponds to the impedance of an electrical load which consumes electrical energy. For illustrative purposes, FIG. 6 shows the range of the input impedance Z of the converter unit 2 in the converter circuit, from which the input impedance Z corresponds to the impedance of an electrical load which consumes electrical energy, illustrated in a shaded form. A choice of the input impedance Z such as this allows a significant improvement to be achieved in the damping, and therefore in the reduction of the undesirable oscillations in the power supply system voltage $u_G$ above the fundamental frequency.

In accordance with an exemplary embodiment, the filtered power supply system current $i_{GTP}$ can be regulated, as already mentioned above, at the power supply system current nominal value $i_{Gref}$ using a proportional-integral characteristic, since this is distinguished by simplicity. However, alternatively, it would also be feasible for the filtered power supply system current $i_{GTP}$ to be regulated at the power supply system current nominal value $i_{Gref}$ using a dead-beat characteristic, by means of iteration. It should be mentioned that, however, it would also be feasible to use any other regulation characteristic.

Figure 4:
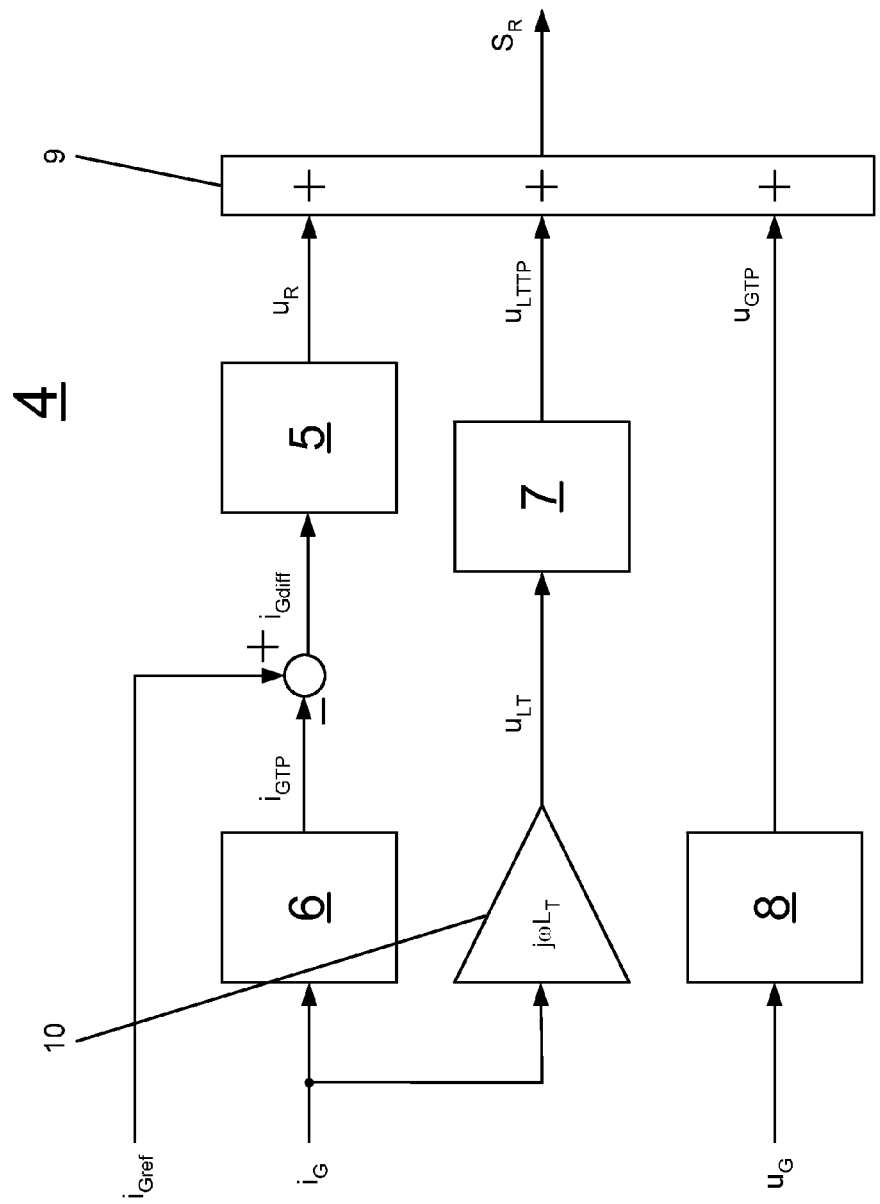
FIG. 4 shows a regulating apparatus for an apparatus for carrying out a method for operation of the converter circuit according to an exemplary embodiment of the present disclosure.

As shown in FIG. 1, the conventional apparatus for carrying out the conventional method of operation of a converter circuit has a regulating apparatus 4, which is used to produce the regulating signal $S_R$ and is connected via a control circuit 3 for formation of the control signal $S_A$ to the controllable power semiconductor switches in the converter unit. FIG. 4 shows an exemplary embodiment of a regulating apparatus 4 for the apparatus according to the present disclosure for carrying out a method for operation of the converter circuit. In accordance with an exemplary embodiment of the present disclosure, the regulating apparatus 4 as shown in FIG. 4 includes a first filter 6 for formation of the filtered power supply system current $i_{GTP}$ by filtering the power supply system current $i_G$ using a low-pass filter characteristic, a second filter 7 for formation of the filtered transformer inductance voltage $u_{LTTP}$ by filtering the transformer inductance voltage ($u_{LT}$), which is formed from the power supply system current $i_G$, using a low-pass filter characteristic, and a third filter 8 for formation of the filtered power supply system voltage $u_{GTP}$ by filtering the power supply system voltage $u_G$ using a low-pass filter characteristic. Furthermore, the regulating apparatus 4 includes an addition unit 9 for formation of the regulating signal $S_R$ by addition of the regulator voltage $u_R$, the filtered transformer inductance voltage $u_{LTTP}$ and the filtered power supply system voltage $u_{GTP}$. In addition the regulating apparatus 4 includes a regulator unit 5 for formation of the regulator voltage $u_R$ by regulating the filtered power supply system current $i_{GTP}$ at the power supply system current nominal value $i_{Gref}$.

As shown in FIG. 4, the regulating apparatus 4 also includes a calculation unit 10 for calculation of the transformer inductance voltage $u_{LT}$ from the power supply system current $i_G$ and a transformer inductance $L_T$, with the calculation then being carried out using the already mentioned formula.

In accordance with an exemplary embodiment, the first, second and third filters 6, 7, 8 can each be second-order low-pass filters, that is to say, each of the filters 6, 7, 8 carries out the second-order filtering of the respective variable using a low-pass filter characteristic. Furthermore, the transfer functions of the first, second and third filters 6, 7, 8 are chosen such that the input impedance Z of the converter unit 2 corresponds to the impedance of an electrical load which consumes electrical energy. In this context, reference is once again made to the shaded area in FIG. 6, which shows the range in which the input impedance Z of the converter unit 2 corresponds to the impedance of an electrical load which consumes electrical energy.

In accordance with an exemplary embodiment, the regulator unit 5 can also regulate the filtered power supply system current $i_{GTP}$ at the power supply system current nominal value $i_{Gref}$ using a proportional-integral characteristic. As an alternative to this, it is also feasible for the regulator unit 5 to regulate the filtered power supply system current $i_{GTP}$ at the power supply system current nominal value $i_{Gref}$ using a dead-beat characteristic, by means of iteration.

In accordance with an exemplary embodiment, any or all of the steps in the method according to the present disclosure can be implemented by a processor (e.g., a digital signal processor) of a computer-processing device (e.g., a CPU), where the processor is configured to execute a software program recorded on a non-transitory computer-readable recording medium (e.g., ROM, a hard disk drive, optical memory, flash memory or any other type of non-volatile memory). Accordingly, exemplary embodiments of the present disclosure provide a non-transitory computer-readable recording medium having a program recorded thereon that causes a processor of a computer processing device to carry out the above-described features of the method for operation of a converter circuit, according to the exemplary embodiments described herein. Furthermore, the apparatus according to the disclosure as described in detail above can also be implemented in a computer system, in particular in a digital signal processor.

Overall, it has been possible to show that the exemplary apparatus, as shown in FIG. 4, for example, for carrying out the method according to the present disclosure for operation of the converter circuit can be implemented very easily and at low cost, since the circuit complexity is extremely low and, furthermore, only a small number of components are required for construction. This apparatus therefore allows the method according to the disclosure to be carried out particularly easily.

It will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

LIST OF REFERENCE SYMBOLS

1 Electrical AC voltage power supply system
2 Converter circuit
3 Control circuit
4 Regulating apparatus
5 Regulator unit
6 First filter
7 Second filter
8 Third filter
9 Addition unit
10 Calculation unit

What is claimed is:

1. A method for operation of a converter circuit, wherein the converter includes a converter unit having a multiplicity of controllable power semiconductor switches, and the converter unit is connected via a transformer to a three-phase electrical AC voltage power supply system, wherein the method comprises:
controlling the controllable power semiconductor switches by means of a control signal which is formed from a regulating signal;
forming a filtered power supply system current by filtering a power supply system current using a low-pass filter characteristic, the filtering of the power supply system current being carried out in a first filtering process using a system which rotates at the fundamental frequency of a power supply system voltage;
forming a filtered transformer inductance voltage by filtering the transformer inductance voltage, which is formed from the power supply system current, using a low-pass filter characteristic, the filtering of the transformer inductance voltage being carried out in a second filtering process using a system which rotates at the fundamental frequency of the power supply system voltage;
forming a filtered power supply system voltage filtering the power supply system voltage using a low-pass filter characteristic, the filtering of the power supply system voltage being carried out in a third filtering process using a system which rotates at the fundamental frequency of the power supply system voltage; and
forming the regulating signal by addition of a regulator voltage, the filtered transformer inductance voltage, and the filtered power supply system voltage,
wherein the regulator voltage is formed by regulating the filtered power supply system current at a power supply system current nominal value.

2. The method as claimed in claim 1, comprising:
calculating the transformer inductance voltage from the power supply system current and a transformer inductance.

3. The method as claimed in claim 1, wherein the filtering processes are each carried out with a second order, using a low-pass filter characteristic.

4. The method as claimed claim 1, comprising:
selecting transfer functions of the filtering processes on the basis of using a low-pass filter characteristic, such that an input impedance of the converter unit corresponds to an impedance of an electrical load which consumes electrical energy.

5. The method as claimed in claim 1, comprising:
regulating the filtered power supply system current at the power supply system current nominal value using a proportional-integral characteristic.

6. The method as claimed in claim 1, comprising:
regulating the filtered power supply system current at the power supply system current nominal value using a dead-beat characteristic, by means of iteration.

7. An apparatus for carrying out a method for operation of a converter circuit, wherein the converter circuit includes a converter unit having a multiplicity of controllable power semiconductor switches, and the converter circuit is connected via a transformer to a three-phase electrical AC voltage power supply system,
wherein the apparatus comprises a regulating apparatus which is configured to produce a regulating signal and is connected via a control circuit for forming a control signal to the controllable power semiconductor switches, wherein the regulating apparatus includes:
a first filter configured to form a filtered power supply system current by filtering a power supply system current using a low-pass filter characteristic, the first filter being configured to filter the power supply system current using a system which rotates at the fundamental frequency of a power supply system voltage;
a second filter configured to form a filtered transformer inductance voltage by filtering a transformer inductance voltage, which is formed from the power supply system current, using a low-pass filter characteristic, the second filter being configured to filter the transformer inductance voltage using a system which rotates at the fundamental frequency of the power supply system voltage;
a third filter configured to form a filtered power supply system voltage by filtering the power supply system voltage using a low-pass filter characteristic, the third filter configured to filter the power supply system voltage using a system which rotates at the fundamental frequency of the power supply system voltage;
an addition unit configured to form the regulating signal by addition of a regulator voltage, the filtered transformer inductance voltage, and the filtered power supply system voltage; and
a regulator unit configured to form the regulator voltage by regulating the filtered power supply system current at a power supply system current nominal value.

8. The apparatus as claimed in claim 7, wherein the regulating apparatus comprises a calculation unit configured to calculate the transformer inductance voltage from the power supply system current and a transformer inductance.

9. The apparatus as claimed in claim 7, wherein the first, second and third filters are each second-order low-pass filters.

10. The apparatus as claimed in claim 7, wherein transfer functions of the first, second and third filters are selected such that an input impedance of the converter unit corresponds to an impedance of an electrical load which consumes electrical energy.

11. The apparatus as claimed in claim 7, wherein the regulator unit is configured to regulate the filtered power supply system current at the power supply system current nominal value using a proportional-integral characteristic.

12. The apparatus as claimed in claim 7, wherein the regulator unit is configured to regulate the filtered power supply system current at the power supply system current nominal value using a dead-beat characteristic, by means of iteration.

13. The method as claimed in claim 2, wherein the filtering processes are each carried out with a second order, using a low-pass filter characteristic.

14. The method as claimed claim 13, comprising:
selecting transfer functions of the filtering processes on the basis of using a low-pass filter characteristic, such that an input impedance of the converter unit corresponds to an impedance of an electrical load which consumes electrical energy.

15. The method as claimed in claim 13, comprising:
regulating the filtered power supply system current at the power supply system current nominal value using a proportional-integral characteristic.

16. The method as claimed in claim 13, comprising:
regulating the filtered power supply system current at the power supply system current nominal value using a dead-beat characteristic, by means of iteration.

17. The method as claimed in claim 4, comprising:
regulating the filtered power supply system current at the power supply system current nominal value using a proportional-integral characteristic.

18. The method as claimed in claim 4, comprising:
regulating the filtered power supply system current at the power supply system current nominal value using a dead-beat characteristic, by means of iteration.

19. The apparatus as claimed in claim 8, wherein the first, second and third filters are each second-order low-pass filters.

20. The apparatus as claimed in claim 19, wherein transfer functions of the first, second and third filters are selected such that an input impedance of the converter unit corresponds to an impedance of an electrical load which consumes electrical energy.

21. The apparatus as claimed in claim 19, wherein the regulator unit is configured to regulate the filtered power supply system current at the power supply system current nominal value using a proportional-integral characteristic.

22. The apparatus as claimed in claim 19, wherein the regulator unit is configured to regulate the filtered power supply system current at the power supply system current nominal value using a dead-beat characteristic, by means of iteration.

23. The apparatus as claimed in claim 10, wherein the regulator unit is configured to regulate the filtered power supply system current at the power supply system current nominal value using a proportional-integral characteristic.

24. The apparatus as claimed in claim 10, wherein the regulator unit is configured to regulate the filtered power supply system current at the power supply system current nominal value using a dead-beat characteristic, by means of iteration.

25. A non-transitory computer-readable recording medium having a computer program recorded thereon that causes a processor a computer processing device to carry out a method for operation of a converter circuit, wherein the converter includes a converter unit having a multiplicity of controllable power semiconductor switches, and the converter unit is connected via a transformer to a three-phase electrical AC voltage power supply system, wherein the program causes the processor to execute operations comprising:
controlling the controllable power semiconductor switches by means of a control signal which is formed from a regulating signal;
forming a filtered power supply system current by filtering a power supply system current using a low-pass filter characteristic, the filtering of the power supply system current being carried out in a first filtering process using a system which rotates at the fundamental frequency of a power supply system voltage;
forming a filtered transformer inductance voltage by filtering the transformer inductance voltage, which is formed from the power supply system current, using a low-pass filter characteristic, the filtering of the transformer inductance voltage being carried out in a second filtering process using a system which rotates at the fundamental frequency of the power supply system voltage;
forming a filtered power supply system voltage filtering the power supply system voltage using a low-pass filter characteristic, the filtering of the power supply system voltage being carried out in a third filtering process using a system which rotates at the fundamental frequency of the power supply system voltage; and
forming the regulating signal by addition of a regulator voltage, the filtered transformer inductance voltage, and the filtered power supply system voltage,
wherein the regulator voltage is formed by regulating the filtered power supply system current at a power supply system current nominal value.

* * * * *